United States Patent
Li

(10) Patent No.: US 9,892,019 B2
(45) Date of Patent: Feb. 13, 2018

(54) USE CASE DRIVEN STEPPING COMPONENT AUTOMATION FRAMEWORK

(71) Applicant: SuccessFactors, Inc., South San Francisco, CA (US)

(72) Inventor: Yuan Li, Shanghai (CN)

(73) Assignee: SUCCESSFACTORS INC., South San Francisco, CA (US)

( * ) Notice: Subject to any disclaimer, the term of this patent is extended or adjusted under 35 U.S.C. 154(b) by 168 days.

(21) Appl. No.: 14/884,799

(22) Filed: Oct. 16, 2015

(65) Prior Publication Data

US 2017/0109257 A1    Apr. 20, 2017

(51) Int. Cl.
*G06F 11/36* (2006.01)
*G06F 9/44* (2018.01)

(52) U.S. Cl.
CPC ............ *G06F 11/3636* (2013.01); *G06F 8/70* (2013.01)

(58) Field of Classification Search
CPC .......................... G06F 11/3636; G06F 11/3668
USPC ........................................................ 714/38.1
See application file for complete search history.

(56) References Cited

U.S. PATENT DOCUMENTS

| | | | | |
|---|---|---|---|---|
| 8,473,919 B2* | 6/2013 | Cutler | ................ | G06F 11/366 717/124 |
| 9,178,903 B1* | 11/2015 | Kaplan | ................ | H04L 63/1458 |
| 2004/0107125 A1* | 6/2004 | Guheen | ................ | G06Q 99/00 705/319 |
| 2005/0166094 A1* | 7/2005 | Blackwell | ........... | G06F 11/3664 714/38.14 |
| 2007/0067754 A1* | 3/2007 | Chen | ................ | G06F 11/0778 717/127 |
| 2007/0162894 A1* | 7/2007 | Noller | ................ | G06F 11/3688 717/124 |
| 2008/0040732 A1* | 2/2008 | Akiyama | ................ | G06F 8/30 719/328 |
| 2008/0155356 A1* | 6/2008 | Boskovic | ................ | G06F 11/26 714/45 |
| 2010/0030626 A1* | 2/2010 | Hughes | ............. | G06Q 30/0208 717/128 |
| 2012/0005537 A1* | 1/2012 | Chen | ................ | G06F 11/3692 714/38.1 |
| 2013/0152047 A1* | 6/2013 | Moorthi | ................ | G06F 11/368 717/124 |
| 2014/0082420 A1* | 3/2014 | Greer | ................ | G06F 11/3692 714/33 |

(Continued)

*Primary Examiner* — Chae Ko
(74) *Attorney, Agent, or Firm* — Fountainhead Law Group P.C.

(57) ABSTRACT

A framework for improving robustness in the execution of software workflows is described herein. One such workflow is a testing scenario, where multiple testing modules are to be executed sequentially, with some of the modules receiving as input the output of other modules. Many types of modules are contemplated, such as Application Program Interface (API) modules, User Interface (UI) modules, Database (DB) modules, and the like. Each of these modules may invoke, respond to, and/or extract data from various subjects of the testing scenario, among other operations. One aspect of the invention wraps each of these modules in a software component, such that disparate module types can be operated on with a common interface. In one embodiment, the common interface enables a test executor to retry and/or debug the software components in novel ways.

10 Claims, 5 Drawing Sheets

(56) References Cited

U.S. PATENT DOCUMENTS

2016/0156657 A1* 6/2016 Kaplan ............... H04L 63/1433
                                                    726/25
2016/0210226 A1* 7/2016 Hall .................... G06F 11/3672
2017/0083392 A1* 3/2017 Lupescu ............... G06F 11/079

* cited by examiner

USE CASE DRIVEN STEPPING COMPONENT AUTOMATION FRAMEWORK

BACKGROUND

Software workflows, such as test automation, batch executions, and the like, face challenges of robustness. Such workflows may execute many software components, each of which may depend on the result(s) of one or more previously executed components. Moreover, each component may take a long time to execute. As such, an error in one of the components may cause the workflow to finish prematurely, without returning the expected result. Sometimes the error is transitory, in which case re-running the workflow may be enough for the error to disappear. In other scenarios, the error represents a programming defect that must be investigated by a software engineer. In order to reproduce the error, the software engineer must re-run the workflow in order to re-create the state in which the error occurred. In both scenarios, re-running the workflow is costly in time and computing resources.

Therefore, there is a need for an improved framework that addresses the abovementioned challenges.

SUMMARY

A framework for improving robustness in the execution of software workflows is described herein. One such workflow is a testing scenario, where multiple testing modules are to be executed sequentially, with some of the modules receiving as an input an output, of other modules. Many types of modules are contemplated, such as Application Program Interface (API) modules, User Interface (UI) modules, Database (DB) modules, and the like. Each of these modules may invoke, respond to, and/or extract data from various subjects of the testing scenario, among other operations. One aspect of the invention wraps each of these modules in a software component, such that disparate module types can be operated on with a common interface. In one embodiment, the common interface enables a test executor to retry and/or debug the software components in novel ways.

In accordance with at least one aspect of the framework, a plurality of software components are received by a test executor. At least one of the plurality of software components is programmed to receive as an input an output generated by other received software components. The software components may be executed, such that the output from each component is provided as the input to subsequently executed software components. The output is also provided to the test executor. Then, upon receiving an error indication from a currently executing software component, the test executor is enabled to retry execution of the currently executing software component, providing as the input one or more outputs retained from the earlier executed software components. In cases where the error indication was caused by issues of robustness, e.g., unresponsive web servers, network outages, etc., retrying the currently executing component may be enough to resolve the issues and continue the test case. By enabling the retry in this manner, significant amounts of time and computing resources are saved by not re-executing all of the previously executed software components.

In another embodiment, each software component is provided an action context with which to store data useful for debugging, such as user identifiers (IDs), login credentials, and the like. In one embodiment, this data is transient and would otherwise be lost when one of the software components encounters an error. By persisting the data stored in the action context, a quick debug scenario is enabled, whereby the action context data is loaded into a debugger, enabling software developers to better understand what had caused the error indication.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
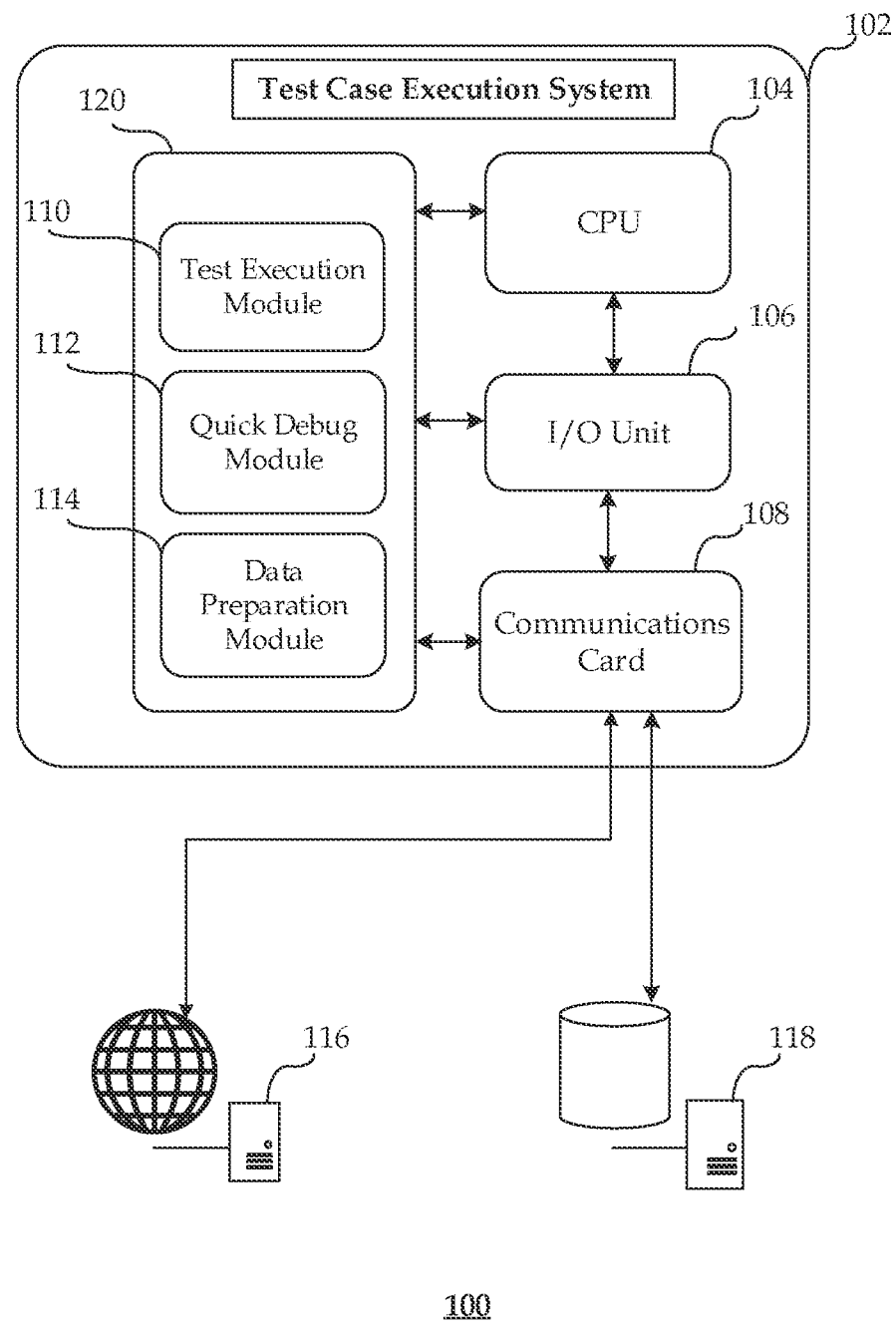
FIG. 1 is a block diagram illustrating an exemplary architecture.

FIG. 1 is a block diagram illustrating an exemplary architecture 100 that may be used to implement the framework described herein. Generally, architecture 100 may include a Test Case Execution System 102, a web server 116 and a database server 118. It should be appreciated that the present framework is described in the context of a test case execution for the purposes of illustration only. The present framework may also be applied to other software workflows, such as batch execution, long running tasks, and so forth.

The Test Case Execution System 102 can be any type of computing device capable of responding to and executing instructions in a defined manner, such as a workstation, a server, a portable laptop computer, another portable device, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems.

The test case execution system 102 may be communicatively coupled to one or more other computer systems or devices via the network. For instance, the system may further be communicatively coupled to one or more database server 118. The database server 118 may be, for example, any database (e.g., relational database, in-memory database, etc.), an entity (e.g., set of related records), or a data set included in the database. In some implementations, the database server serves to store test case data, riser data including login data, and so forth. In one embodiment, software components create, manipulate, and delete entries in the database server in the course of executing a test case.

The test case execution system 102 may also be communicatively coupled to a web server 116. The web server may implement Hyper Text Transfer Protocol (HTTP), Secure HTTP (HTTPS), or the like, and to respond to web requests with web pages, extensible Markup Language (XML) content, user profiles, images, forms, and any other types of content. The web server may also act as a web service, receiving requests and responding with data using protocols such as Simple Object Access Protocol (SOAP), Representational State Transfer (REST), and the like.

The test case execution system 102 may act as a server and operate in a networked environment using logical connections to the web server 116 and database server 118. In one embodiment, test modules may conduct test operations against the web server and/or database server.

Test execution module 110 includes a logic for executing a plurality of software components with a retry logic. In one embodiment, the retry logic is enabled by saving a data output from successively executed software components, such that upon encountering an error indication in a currently executing software component, the currently executing software component can be retried with the saved data output. This process is described in detail below.

Quick debug module 112 includes a logic for initiating a debug session upon receiving an error indication from a currently executing software component. In one embodiment, the debug session is augmented with data that was stored in the action context by previously executed software components. Examples of types of data that might be stored by the executing software components in the action context include a user identifier (ID), a key to a database entry, a user login credential, or the like. In one embodiment, the action context stores transient data that would otherwise be lost when the error indication was encountered. By making the data stored in the action context available during the debug session, software engineers are enabled to quickly diagnose the cause of the error indication. Quick debug may optionally utilize the retry mechanism discussed in reference to the test execution module 110.

Data preparation module 114 includes a logic for identifying which of the received software components prepare data for use by the other software components, and which of the received software components used prepared data to execute testing logic and evaluate the results. Examples of the data preparation include retrieving, generating, or creating data, or the like. In some embodiments, robustness is improved by identifying multiple data preparation components that obtain the same data from different sources. For example, Application Program interface (API), User Interface (UI), and Database (DB) based data preparation components may all be capable of retrieving a user profile, which may subsequently be put under test. In this way, if one or more of the data preparation components fail, others may be substituted. This substitution may be applied in combination with the above described retry mechanism—each of the substitutable software components may be retried, each time being provided the outputs of the previously executed software components. Similarly, the substitution of data preparation components may also be performed in conjunction with quick debug, discussed above in reference to the quick debug module 112.

Figure 2:
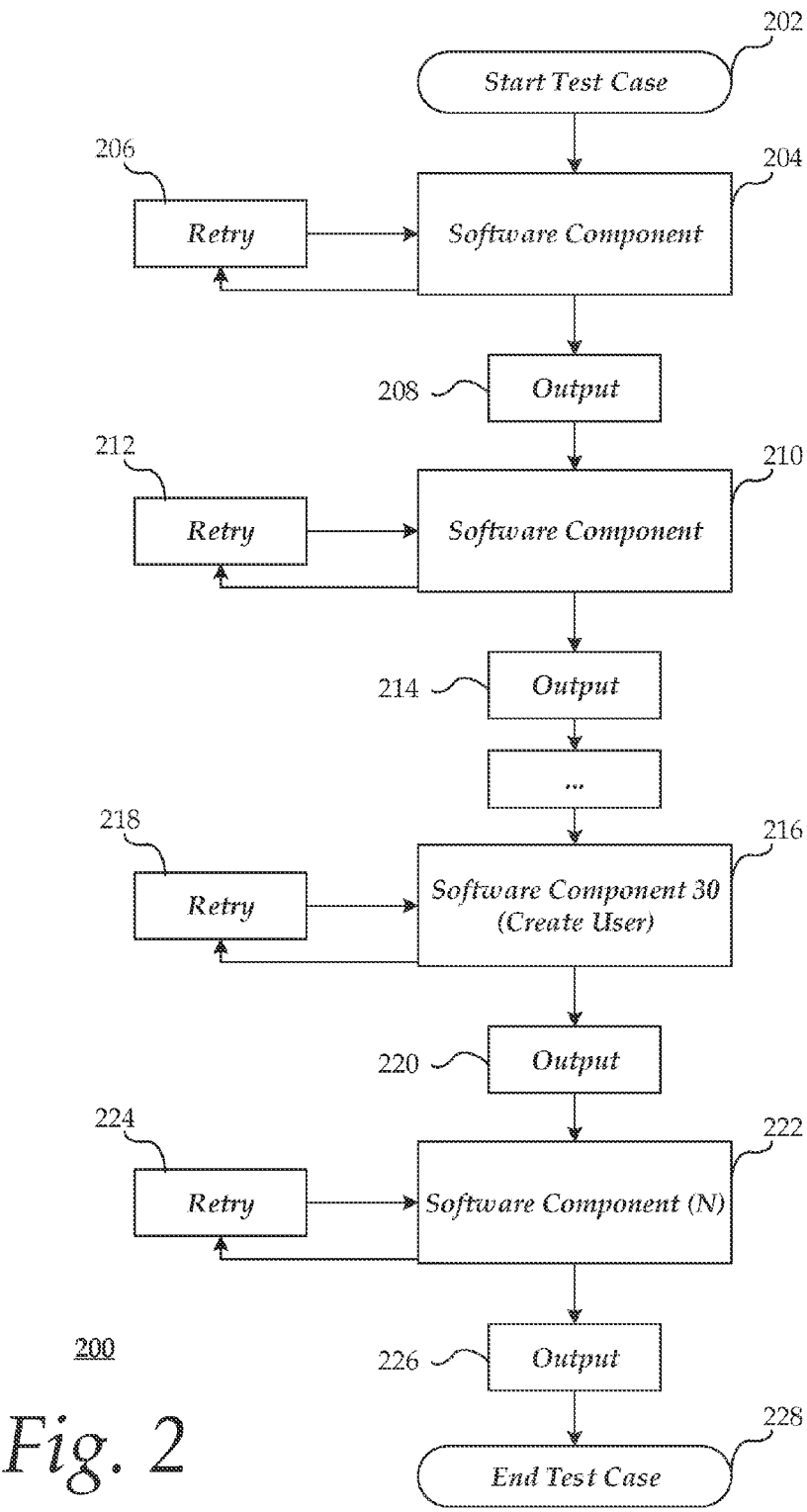
FIG. 2 is a flow chart illustrating one embodiment of retry execution of a software component in the context of a test case.

FIG. 2 is a flow chart illustrating an exemplary method 200 of a retry execution of a software component in the context of a test. The process may be performed automatically or semi-automatically by the test case execution system 102, described above with reference to FIG. 1.

At Start Test Case 202, a plurality of software components are received. In one embodiment, the plurality of software components comprise a test case, with each of the plurality of software components comprising a step. However, other embodiments are similarly contemplated, including batch execution in a production environment, execution of tasks that are distributed among multiple systems, and the like.

In one embodiment, each of the software components wraps a test module. Many types of test modules are contemplated, such as API modules, UI modules, DB modules, and the like. Each of these modules may invoke, respond to, and/or extract data from various subjects of the testing scenario, such as the web server 116 and database server 118. In one embodiment, the software components implement a common interface invocable by the test system, such that different types of test modules can be operated on in the same or similar manner. In one embodiment, the common interface enables a test executor to retry and/or debug the software components in novel ways.

In one embodiment, software component 204 is executed by the test system. As the first software component to be executed, software component 204 is supplied with an initial set of parameters supplied to the test case.

When software component 204 succeeds, an output 208 is provided to software component 210 and the test system. When the software component 204 fails to execute successfully, the output 208 is not provided to the software component 210 or the test system, and instead an error indication is provided to the test system. In one embodiment, the test system retries at step 206 execution of the software component 204, supplying the initial set, of parameters.

Once the software component 204 has executed successfully, the test system in turn executes the software component 210, providing as an input the output 208 and the set of parameters supplied to the test case. In the case of a successful execution, retry at step 212 is not invoked, and an output 214 is provided to the test system and the next software component (not pictured).

FIG. 2 depicts a linear execution of a plurality of software components. However, parallel execution, speculative execution, distributed execution, or any combination of the above are also contemplated. For example, the test case execution system 102 may be provided with a dependency relationship between the software components, such that the software components may be executed in any order that satisfies the dependency relationship.

Software component 30 (create user) 216 may require as an input the outputs from one or more of the previously executed software containers, such as output 208, output 214, etc. The software component 30 (create user) 216 may also require one or more parameters supplied to the test case. Upon execution, the software component 30 (create user) 216 may encounter an error. One type of error that may be encountered is a robustness error. Robustness issues may be cured by retrying execution. Robustness issues include, for example, the web server 116 taking too long to respond to a request, returning a partial web page, returning a malformed web page, etc. Whatever the cause of the error, the test system may decide to retry execution. The number of times a retry may be performed is not limited, and may be set by a user, a global policy, or the like.

As such, in one embodiment, when an error indication is received from the software component 30 (create user) 216, and the test system determines that a retry 218 should be attempted, the outputs from any previously executed components, e.g., output 208, output 214, etc., are retrieved and provided to the software component 30 (create user) 216 for execution.

FIG. 2 depicts the software component 30 (create user) 216, the 30th software component to be executed, which may depend on the outputs of up to 29 previously executed software components, and which produces as a result output 220. However, this is merely an example—any number of software components are contemplated, any or all of which may be retried. This is indicated by software component (N) 222, which may be retried at step 224 and/or emit an output 226 before end test case at step 228 is reached.

Figure 3:
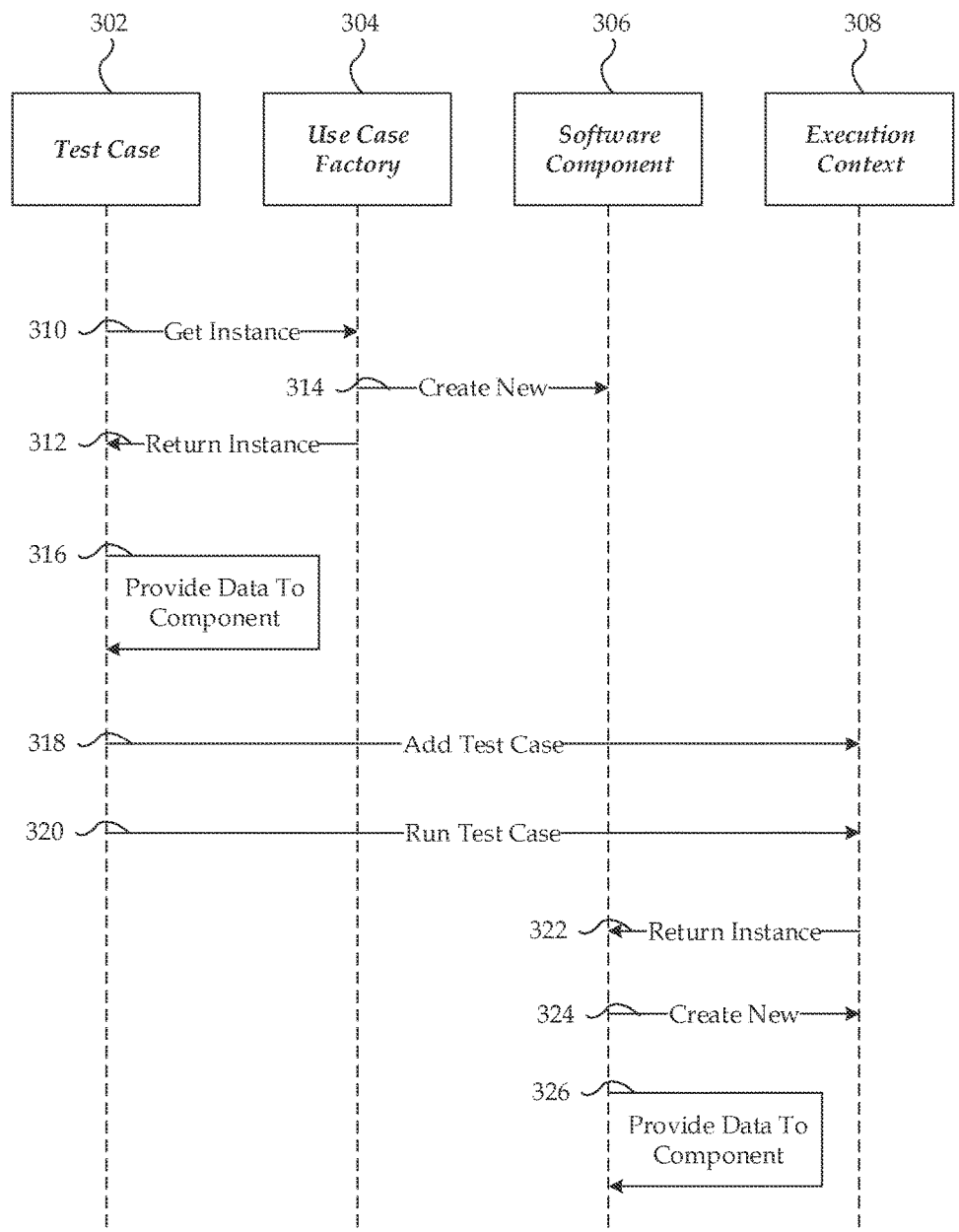
FIG. 3 is a sequence diagram illustrating one embodiment of executing the test case.

FIG. 3 is a sequence diagram 300 illustrating one embodiment of executing a test case 302. The test case may create any number of software components for execution by an execution context 308.

Initially, the test case may invoke a get instance 310 on a use case factory 304. The get instance 310 may be a single function that receives a parameter indicating what type of test module is requested. Additionally or alternatively, the get instance 310 may be called on one of many use case factories, each corresponding to the type of test module desired.

Examples of the test modules include modules that create a user profile, extract the user profile information from a web page, store the user profile information in a database, and the like. While these examples deal with profile information, any type of software using any type of data may be similarly tested, such as operating systems, application servers, mobile applications, e-commerce, video games, messaging applications, databases, social networking applications, and the like.

The use case factory 304 creates the requested test module, and then wraps the module in a software component. The use case factory invokes a create new 314 on a software component 306. In one embodiment, the software component 306 represents a single type of component that wraps every type of test module. In another embodiment, the software component 306 may be one of many distinct types of software component implementations, each tailored to specific types of test modules. For example, UI based test modules, which are designed to interact with a web browser, a desktop application, a mobile app, etc., may have a common set of functions that are exposed, such that a single UI software component could invoke them interchangeably.

Upon calling the appropriate create new 314 function on the appropriate software component 306, the use case factory 304 returns an instance 352 of the instantiated software component to the test case 302.

The use case factory 304 then, in some embodiments, provides specific data to a returned component 316. For example, the test case may have created the software component 306 by wrapping a test module that scrapes the user profile information from the web page. In this scenario, the provide data 316 might provide a user identifier, a web site Uniform Resource Locator (URL), or the like, to the returned software component 306.

The test case 302 may cause the functions 310, 312, 314, and 316 to be invoked multiple times—typically once for each test module to be executed. Once the test case, which typically includes multiple test components 306, has been prepared, an add test case 318 is invoked on the execution context 308, followed by a run test case 320, initiating the test.

The execution context 308 will execute at step 322 the test case 302 by executing, in order, the associated software components 306. As each of the software component 306 is executed, an output is received by the execution context 308 and stored.

In one embodiment, when the quick debug module 112 is enabled, the execution context 308 provides each of the software component 306 with an action context. As each software component 306 executes, information relevant to debugging may be stored in the action context, which in one embodiment is serialized and stored to a local file.

In one embodiment, the executing software component 306 encounters an error, and instead of returning an output or adding data to the action context, it provides an error indication to the execution context 308. In response, the execution context 308 may, in one embodiment invoke execute again at step 326 on the software component 306. In one embodiment, the execution context 308 re-uses the existing software component 306, while in another embodiment, the execution context 308 creates a new instance at step 324 of the software component 306, by executing 310, 312, and 316 again. In either case, the execution context 308 provides as an input to the software component 306 the output stored from previously executed software components.

Alternatively or additionally, the execution context 308 may initiate a quick debug session upon receiving the error indication. The quick debug session is initiated by executing the test case again, but with a software debugger attached. The test case is executed again by immediately executing the software component 306 that produced the error indication. As with retrying execution, the quick debug uses the stored output of each of the previously executed software components to provide the software component 306 with the same input as when it produced the error indication. Additionally, the quick debug loads into memory the data saved to the action context by previously executed software components. In this way, a software engineer is enabled to debug the software component 306 with additional information that would otherwise be lost.

Figure 4:
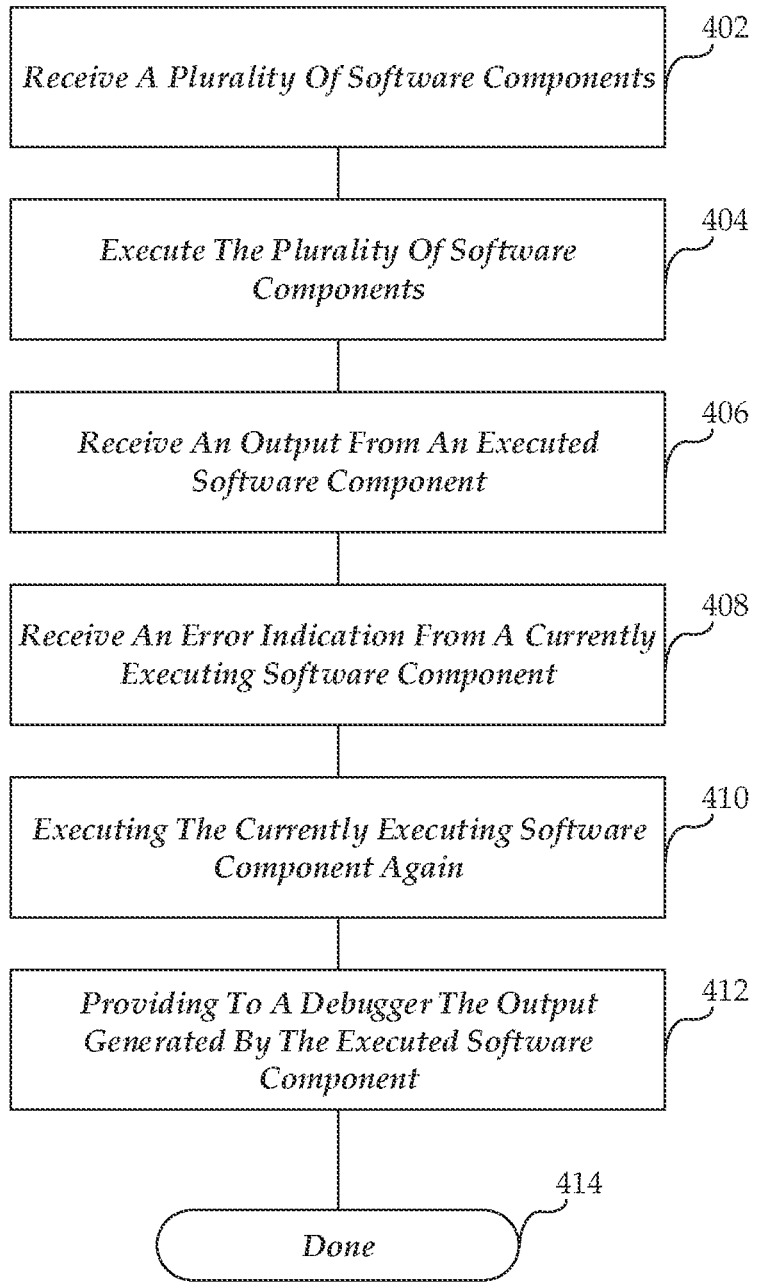
FIG. 4 illustrates an exemplary method of retrying the test case.

FIG. 4 illustrates an exemplary method of retrying and/or quick debugging a test case. In one embodiment, routine 400 may be implemented by the execution context 308 of the test case execution system 102.

In block 402, routine 400 receives a plurality of software components, wherein at least one of the plurality of software components is programmed to receive as an input one or more outputs generated by one or more of the plurality of software components. In this way, a dependency ordering exists between the plurality of software components. In one embodiment, the dependency ordering is a numbered series.

In block 404, routine 400 includes executing the plurality of software components. As indicated above, the plurality of software components has a dependency ordering that they are executed in. In one embodiment, the software components are executed in series, although execution in parallel, or some combination of parallel and serial is similarly contemplated.

In block 406, the routine 400 receives, from an executed software component, an output generated by the executed software component, wherein a currently executing software component also receives from the executed software component an output generated by the executed software component. In one embodiment, the output received by the execution context 308 is serialized and persisted to a non-transitory computer-readable storage medium. When the output is required, as happens when an error indication is received, the output is retrieved from the non-transitory computer readable medium and de-serialized for consumption by the retried software component.

In block 408, the routine 400 receives the error indication from the currently executing software component. In one embodiment, the error indication is an exception, although error codes, error messages, or any other techniques of conveying the existence of the error are similarly contemplated. The error indications may be triggered by any type of computing error, including a logic error, system error, timeout, or the like.

In block 410, routine 400 includes executing again the currently executing software component by providing as an input the output received from the executed software component. In one embodiment, executing again also supplies a test case input—input that was made available to each of the plurality of software components when the test case was initially invoked.

In block 412, routine 400 includes providing, to a debugger, the output generated by the executed software component. The debugger is then enabled to allow a software developer to inspect data that was generated by previously executed software components.

In done block 414, the routine 400 ends.

Figure 5:
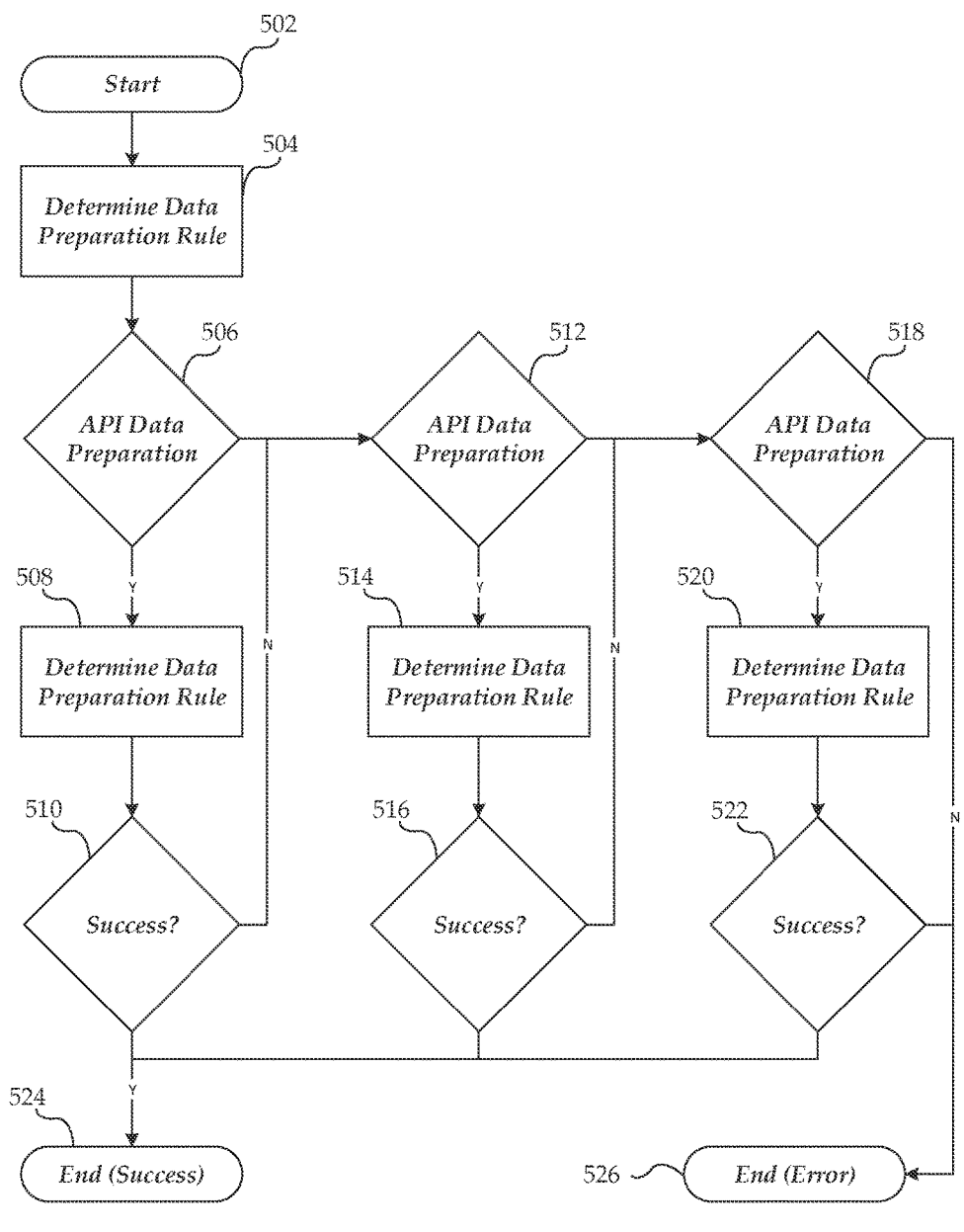
FIG. 5 illustrates an exemplary method of executing a data preparation strategy.

FIG. 5 illustrates an exemplary method 500 of executing a data preparation strategy. In one embodiment, the data preparation strategy is performed by the data preparation module 114 of the test case execution system 102.

The process begins at start block 502. At block 504, a data preparation rule is determined. The data preparation rule determines the order that a group of data preparation rules should be executed in. The data preparation rule may be received from the test case 302, an input by an end user, or determined by a past history of execution. For example, the data preparation rules that use different modalities to retrieve the same data may be ordered based on the success or failure of past test case executions. In one embodiment, data preparation components with the highest success rate are executed first.

The calling order depicted in FIG. 5 is but one example—the order of execution could be different, and more or fewer data preparation rules may be executed.

The process continues at decision block 506, where it is determined whether an API data preparation rules is available. If it is, block 508 is taken, executing the API data preparation component. The API data preparation component may invoke a SOAP or REST based web service, or any other type of remote procedure call. At decision block 510, it is determined whether the API data preparation component succeeded. If it did, then the process ends successfully at done block 524 (success).

However, if the decision block 506 or decision block 510 fail, i.e., an API data preparation component does not exist or did not succeed, control passes to decision block 512, where it is determined whether a UI data preparation component exists. If it does, the control passes to block 514, where the UI data preparation component is executed, after which decision block 516 determines if the UI data preparation component succeeded. If it did, then the control passes to done block 524 (success).

However, if the decision block 512 or decision block 516 fail, i.e., the UI data preparation component does not exist or did not succeed, the control passes to decision block 518, where it is determined whether a DB data preparation component exists. If it does, the control passes to block 520, where the DB data preparation component is executed, after which decision block 522 determines if the DB data preparation component succeeded. If the execution is a success, the control continues to the done block 524 (success), while if it fails, or if there was no DB preparation component, the control falls to done block 526 (error), and the error indication is raised.

A data preparation rule is not limited to one preparation rule of each type—one or more of any of the types of data preparation rules may be tried.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A computer-implemented method of facilitating robust software component execution, comprising:
    receiving a plurality of software components, wherein at least one of the plurality of software components is programmed to receive as an input one or more outputs generated by one or more of the plurality of software components;
    executing, with a processor, the plurality of software components;
    receiving, from an executed software component, an output generated by the executed software component, wherein a currently executing software component also receives from the executed software component the output generated by the executed software component;
    receiving an error indication from the currently executing software component;
    executing again, with the processor, the currently executing software component by providing as the input the output received from the executed software component;
    wherein one or more of the plurality of software components comprise data preparation components, wherein a data preparation component retrieves data for consumption by a subsequently executed software component,
    wherein a plurality of data preparation components define different implementation techniques for retrieving a same type of data consumed by the subsequently executed software component,
    the method further comprising:
    receiving a data preparation rule that defines a calling order in which the plurality of data preparation components are to be executed; and
    executing each of the plurality of data preparation components according to the calling order until one of the data preparation components successfully returns the same type of data.

2. The computer-implemented method of claim 1, further comprising:
    serializing the output generated by the executed software component;

persisting the serialized output to a non-transitory computer readable medium;
retrieving the serialized output from the non-transitory computer readable medium in response to receiving the error indication; and
de-serializing the retrieved serialized output.

3. The computer-implemented method of claim 1, wherein the executing comprises executing the plurality of software components in series, such that the output of the executed software component is received as the input to the next software component in the series.

4. The computer-implemented method of claim 1, wherein the plurality of software components comprise a test case, and wherein each of the software components comprises a plurality of atomic use cases.

5. The computer-implemented method of claim 1, further comprising serializing the output of each executed software component to the non-transitory computer readable medium as each software component is executed.

6. The computer-implemented method of claim 1, wherein one of the plurality of software components includes a user login component, and wherein an output of the user login component includes a login credential.

7. The computer-implemented method of claim 6, wherein executing the currently executing software component again includes using the persisted login credential without re-executing the user login component.

8. A computing apparatus facilitating robust software component execution, the computing apparatus comprising:
a processor; and
a memory storing instructions that, when executed by the processor, configures the apparatus to
receive a plurality of software components, wherein at least one of the plurality of software components is programmed to receive as an input one or more outputs generated by one or more of the plurality of software components,
execute the plurality of software components,
receive, from an executed software component, an output generated by the executed software component,
receive an error indication from a currently executing software component,
execute again, using a debugger, the currently executing software component, and
make available, within the debugger, the output generated by the executed software component
wherein the memory stores further instructions that, when executed by the processor, further configures the apparatus to provide, to one or more of the plurality of software components, an action context, wherein the action context is enabled to receive and store data from the one or more of the plurality of software components, wherein the output generated by the executed software component comprises data received by the action context,
wherein the action context persists data supplied by multiple executed software components,
wherein each of the plurality of software components is assigned a serial number, and wherein the data supplied to the action context by one of the plurality of software components is associated in the action context with a corresponding serial number.

9. The computing apparatus of claim 8, wherein executing comprises executing the plurality of software components based on a dependency ordering, such that a dependent software component is executed after the software component it is dependent on.

10. The computing apparatus of claim 8, wherein the output generated by each of the executed software component is persisted to a local file.

* * * * *